(12) United States Patent
Yang et al.

(10) Patent No.: US 7,372,136 B2
(45) Date of Patent: May 13, 2008

(54) CHIP CARD RETAINING MECHANISM

(75) Inventors: Qing Yang, Shenzhen (CN); Chia-Hua Chen, Tu-Cheng (TW)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 0 days.

(21) Appl. No.: 11/309,684

(22) Filed: Sep. 11, 2006

(65) Prior Publication Data

US 2007/0131778 A1    Jun. 14, 2007

(30) Foreign Application Priority Data

Dec. 9, 2005    (CN)    ............................ 200510102335

(51) Int. Cl.
*H01L 23/02*    (2006.01)

(52) U.S. Cl. ...................... 257/679; 257/727

(58) Field of Classification Search ................ 257/48, 257/784, 723, 724, 679, 680, 727, 726; 438/14, 438/17, 18, 15, 107, 110
See application file for complete search history.

(56) References Cited

U.S. PATENT DOCUMENTS

| | | | | | |
|---|---|---|---|---|---|
| 5,541,448 | A | * | 7/1996 | Carpenter | ................... 257/679 |
| 5,563,771 | A | * | 10/1996 | Bethurum | ................... 361/737 |
| 5,590,028 | A | * | 12/1996 | Duncan | ...................... 361/737 |
| 6,462,273 | B1 | * | 10/2002 | Corisis et al. | .............. 174/521 |

* cited by examiner

*Primary Examiner*—S. V. Clark
(74) *Attorney, Agent, or Firm*—Jeffrey T. Knapp

(57) ABSTRACT

A chip card retaining mechanism for retaining a chip card mounted in an electronic device. The electronic device includes a housing (10). The housing has a battery compartment (12) defined therein. The chip card retaining mechanism includes a receiving portion, and a locking assembly. The receiving portion is formed on the housing for receiving the chip card therein. The receiving portion has an open end (142) facing the battery compartment of the electronic device. The locking assembly includes a stop mechanism, and an elastic arm (26). The stop mechanism is configured for preventing the chip card from being withdrawn from the receiving portion via a top of the receiving portion. The elastic arm is formed on the housing, and has latching portion (262) disposed adjacent the open end for abutting with the chip card.

19 Claims, 6 Drawing Sheets

US 7,372,136 B2

CHIP CARD RETAINING MECHANISM

DESCRIPTION

1. Field of the Invention

The present invention generally relates to chip card retaining mechanisms and, more particularly, to a chip card retaining mechanism for seating a chip card in an electronic device such as a mobile phone.

2. Description of Related Art

Nowadays, electronic devices such as mobile phones are widely used and bring convenience to our lives, as such, electronic devices have become a part of modern life. Every electronic device has a chip card such as a SIM (subscriber identification module) card for carrying information necessary for operating the mobile phone. The chip card may also contain personal information for the subscriber, for example, a listing of frequently used telephone numbers. However, it is necessary to provide a chip card retaining mechanism to hold the chip card in the electronic device.

Referring to FIG. 6, a typical chip card retaining mechanism used in a mobile phone is as follows. The chip card retaining mechanism includes a mounting base 52 and a locking element 54. A receiving groove 520 is defined in the mounting base 52 for receiving a chip card. A connector 50 is disposed in the receiving groove 520. The locking element 54 is mounted on the mounting base 52 and located adjacent to the receiving groove 520. The locking element 54 can move in a direction shown by an arrow. In assembly, the locking element 54 is pushed away from the receiving groove 520 to completely expose the receiving groove 520. A SIM card is received in the receiving groove 520, and the locking element 54 is pushed toward the receiving groove 520 to cover a portion of the receiving groove 520 so that the SIM card cannot be removed from the receiving groove 520.

Although the locking element 54 can be easily moved to assemble the SIM card, when a mobile phone inadvertently undergoes impact, this impact may result in an outer force which removes the locking element 54 from the receiving groove 520, which can result in an ineffective electrical connection between the SIM card and the connector 50. At worst, the SIM card may become completely separated from the receiving groove 520, which badly affects stability of the mobile phone.

What is needed, therefore, is a chip card retaining mechanism, which overcomes the above-described shortcomings.

SUMMARY OF THE INVENTION

A first preferred embodiment includes a chip card retaining mechanism for retaining a chip card mounted in an electronic device. The electronic device includes a housing. The housing has a battery compartment defined therein. The chip card retaining mechanism includes a receiving portion, and a locking assembly. The receiving portion is formed on the housing for receiving the chip card therein. The receiving portion has an open end facing the battery compartment of the electronic device. The locking assembly includes a stop mechanism, and an elastic arm. The stop mechanism is configured for preventing the chip card from being withdrawn from the receiving portion via a top of the receiving portion. The elastic arm is formed on the housing, and has latching portion disposed adjacent to the open end for contacting the chip card.

Other advantages and novel features of the preferred embodiments of the present chip card retaining mechanism and its applications will become more apparent from the following detailed description when taken in conjunction with the accompanying drawings.

BRIEF DESCRIPTION OF THE DRAWINGS

Many aspects of the present chip card retaining mechanisms and their applications can be better understood with reference to the following drawings. The components in the drawings are not necessarily drawn to scale, the emphasis instead being placed upon clearly illustrating the principles of the chip card retaining mechanisms. Moreover, in the drawings, like reference numerals designate corresponding parts throughout the several views.

DETAILED DESCRIPTION OF THE INVENTION

Figure 1:
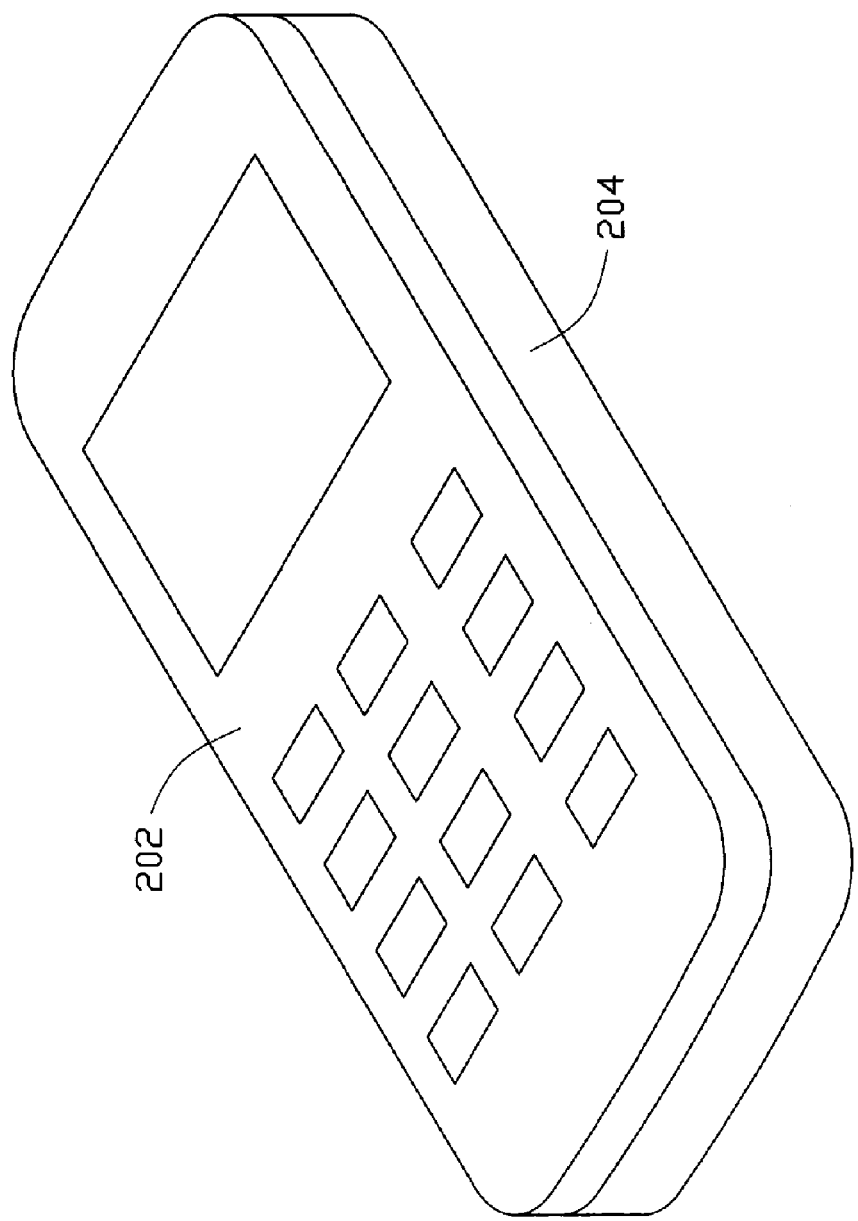
FIG. 1 is an isometric view of an electronic device, which employs a chip card retaining mechanism in accordance with a first preferred embodiment.
Figure 2:
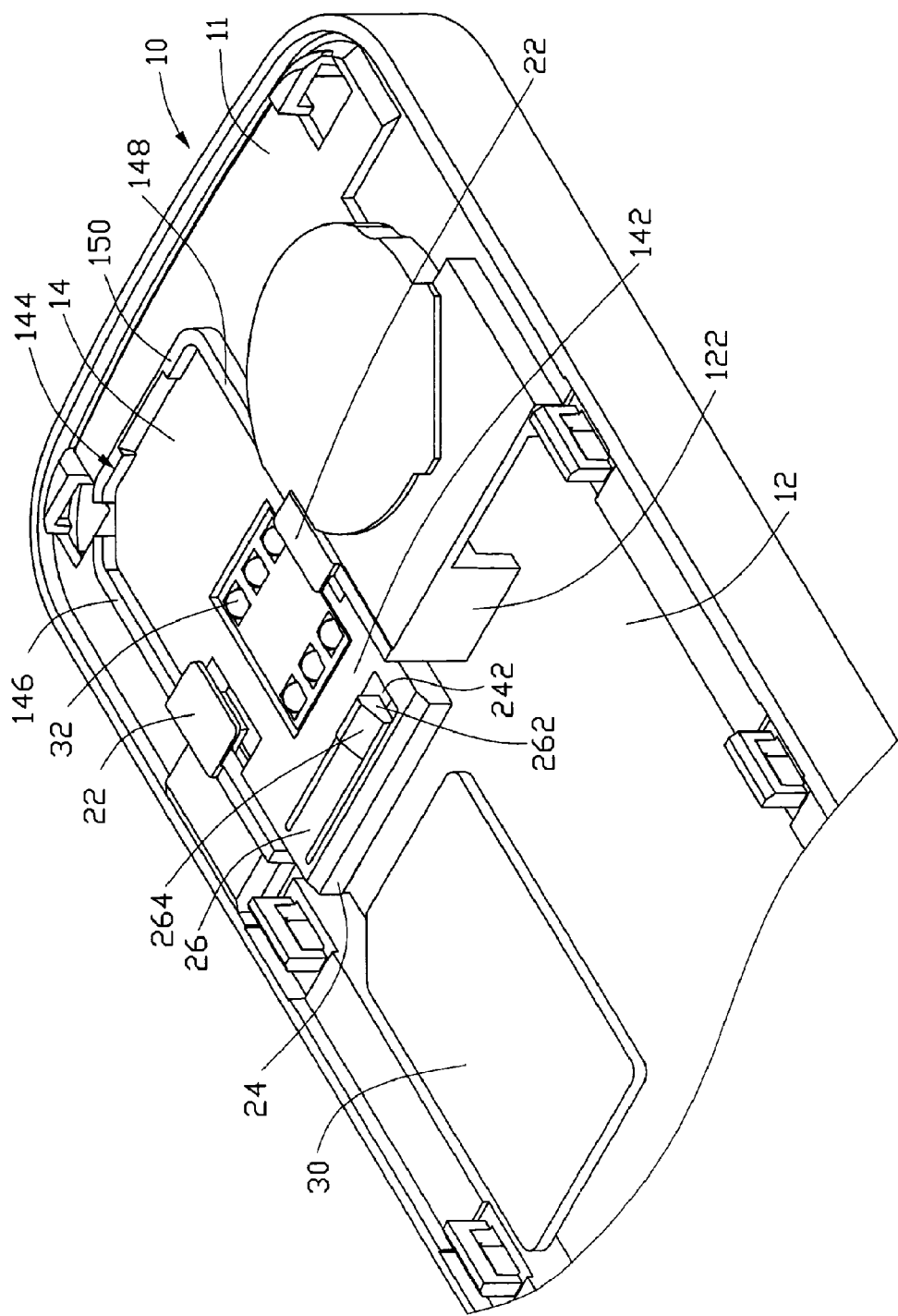
FIG. 2 is an exploded, isometric view of the chip card retaining mechanism of the preferred embodiment.

A chip card retaining mechanism is adapted for retaining a chip card in an electronic device in a manner such that the chip card is electronically connected with a connector in the electronic device. Referring to FIG. 1, the chip card retaining mechanism is applied to an exemplary mobile phone 200, which includes a front cover 202, a housing 10, and a rear cover 204. The front cover 202 and the rear cover 204 cooperatively define an enclosed space. The housing 10 is mounted in the enclosed space. Referring to FIG. 2, in order to identify the used mobile phone, when communicating, a chip card 30, such as a subscriber identification module, also called SIM card, is provided. Referring to FIG. 2, in the figure parts of the housing 10 have been omitted for reasons of clarity. The housing 10 has a battery compartment 12 (partly shown) defined in an upper surface portion 11 thereof, and defined by an inner wall 122. The chip card 30 is electrically connected to a printed circuit board (PCB, not shown) by a connector 32. The battery compartment 12 is for receiving a battery (not shown).

Referring to FIG. 2, the chip card retaining mechanism includes a receiving portion such as a receiving groove 14 for receiving the chip card 30, and a locking member (not labeled).

The receiving groove 14 is disposed adjacent to the battery compartment 12, corresponding to the position of the chip card 30. The receiving groove 14 has an open end 142 facing the battery compartment 12, for insertion or withdrawal of the chip card 30. The open end 142 is located adjacent to the inner wall 122. A strip 144 protrudes from the upper surface portion 11 of the housing 10. The strip 144 and a portion of the upper surface portion 11 cooperatively define the receiving groove 14. The strip 144 includes a first side portion 146, a second side portion 148, and an end portion 150 connecting with the first and second side portions 146, 148. The first side portion 146 and the second side portion 148 are aligned parallel to each other. The first side portion 146 is adjacent to a peripheral edge of the housing 10. The connector 32 is exposed out of a bottom of the receiving groove 14.

The chip card 30 carries information that is necessary for operating the telephone and personal information of the owner and is a kind of integrated circuit card. The chip card 30 is mounted in the receiving groove 14 in contact with the connector 32.

The locking assembly includes two wings 22, and an elastic arm 26 disposed on the housing 10.

The two wings 22 respectively extend from the first side portion 146 and the second side portion 148 toward the receiving groove 14 and are located above the receiving groove 14. The two wings 22 can be rectangular.

The housing 10 is provided with a convex stage 24 extending from the receiving groove 14 toward the battery compartment 12 and ending up with the inner wall 122 of the housing 10. The convex stage 24 has a rectangular opening 242. The elastic arm 26 is provided in the opening 242 and extends from one end of the opening 242 toward another end of the opening 242. The elastic arm 26 is provided with a latching portion 262. The latching portion 262 has a wedge-shaped plane 264 facing the battery compartment 12, for guiding the chip card 30 into the receiving groove 14.

Figure 3:
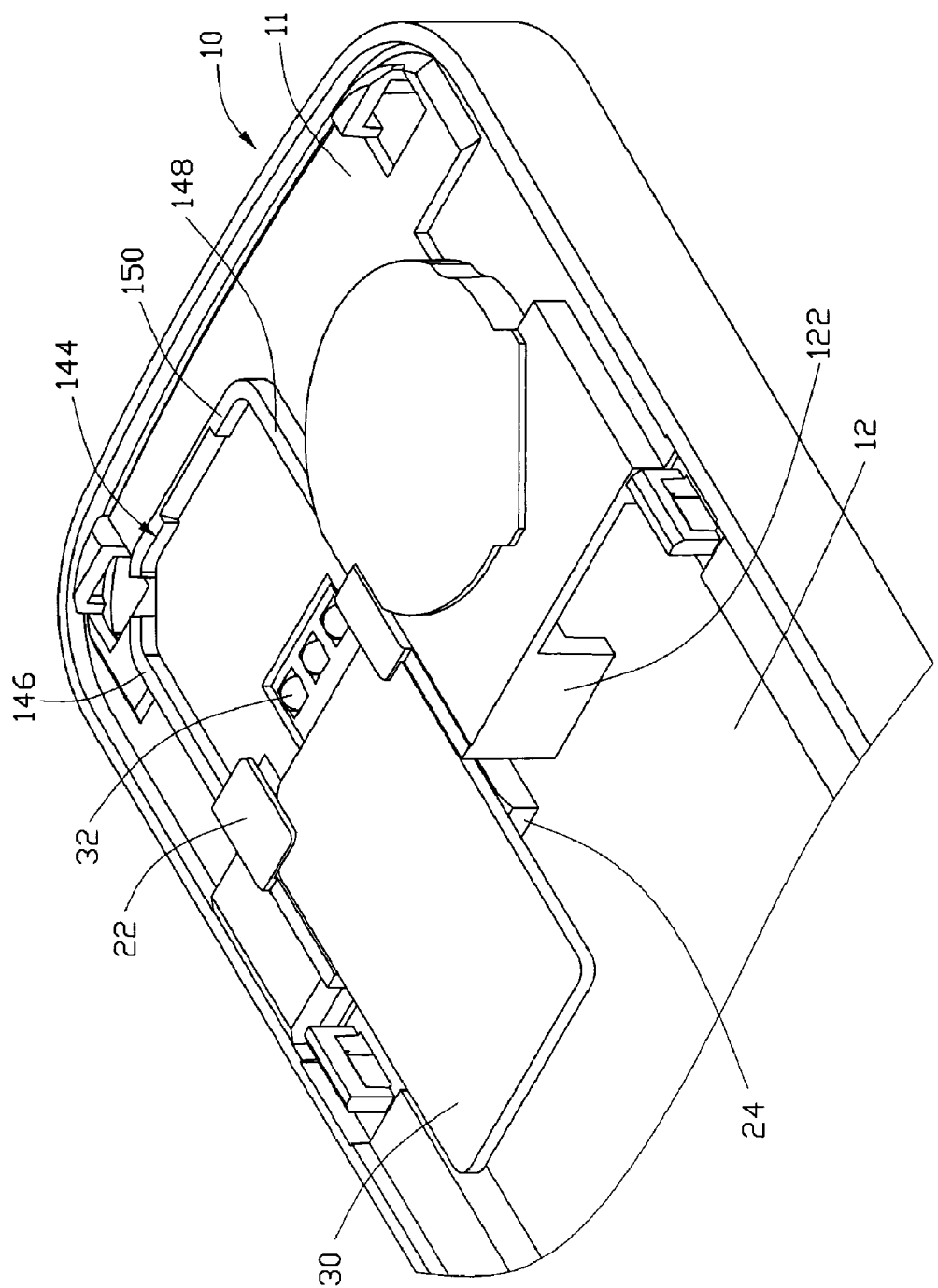
FIG. 3 is an assembled, isometric view of the chip card retaining mechanism of FIG. 2, showing a process of the chip card being assembled.
Figure 4:
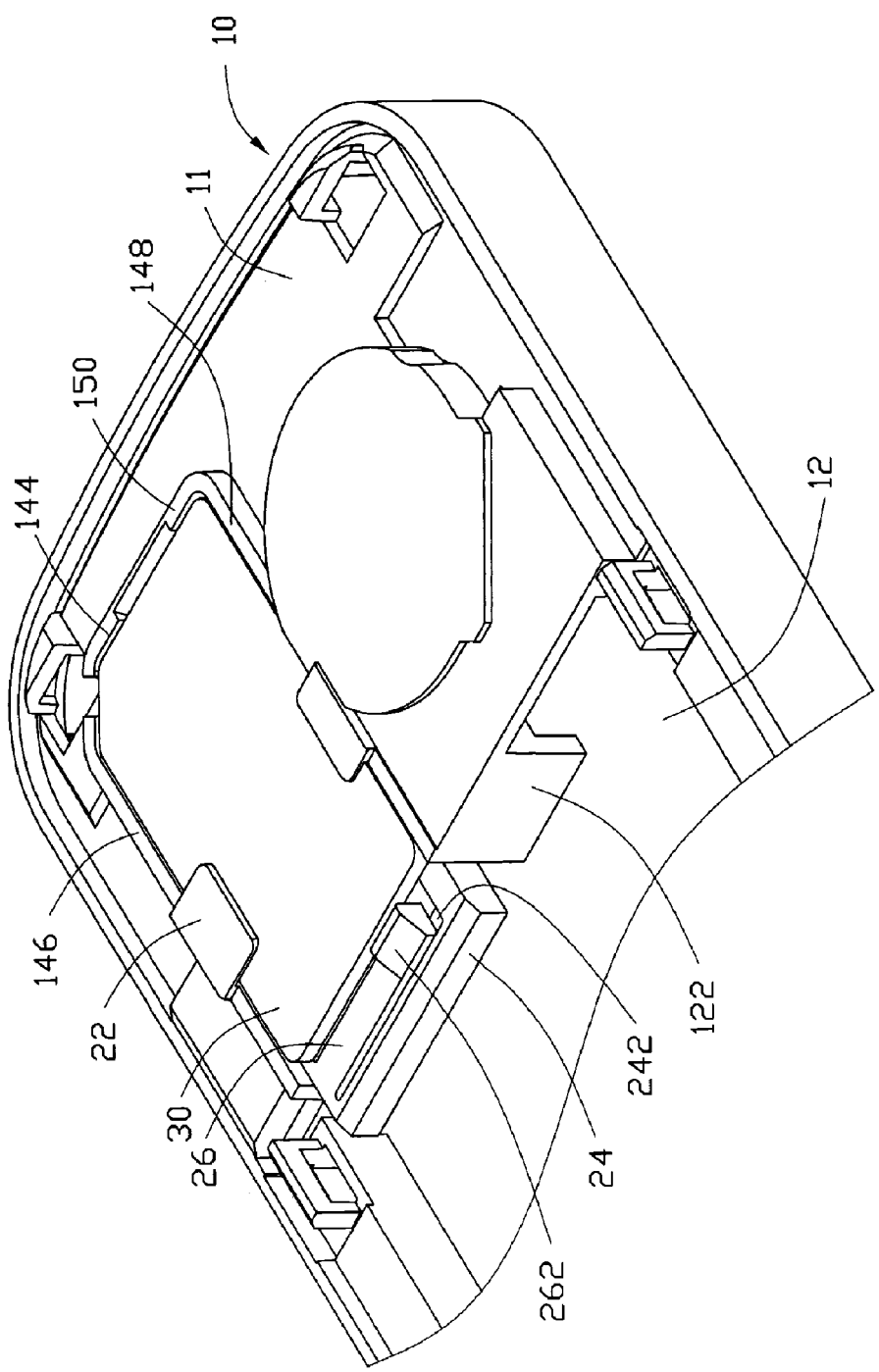
FIG. 4 is an assembled, isometric view of the chip card retaining mechanism of FIG. 2, showing the chip card assembled.

Referring to FIG. 3 to FIG. 4, in assembling and mounting the chip card 30, the latching portion 262 of the elastic arm 26 is pressed downwardly so as to make the latching portion 262 substantially coplanar with the bottom of the receiving groove 14. The chip card 30 is aligned with the open end 142 of the receiving groove 14, and pushed into the receiving groove 14 via the open end 142. The chip card 30 slides in the receiving groove 14 under the guidance of the first side portion 1146 and the second side portion 148 and the wedge-shaped plane 264 of the latching portion 262. When the chip card 30 goes over the elastic arm 26 and is completely contained in the receiving groove 14, the elastic arm 26 automatically rebounds to its original state such that the latching portion 262 of the elastic arm 26 abuts the chip card 30. Thus, the chip card 30 is securely mounted in the receiving groove 14. Thus ensuring, an effective electrical connection between the chip card 30 and the connector 32.

When removing the chip card 30, the latching portion 262 of the elastic arm 26 is pressed downwardly so as to make the latching portion 262 substantially coplanar with a bottom of the receiving groove 14. The chip card 30 is pushed out of the receiving groove 14 via the open end 142 toward the battery compartment 12. As such, the chip card 30 can be removed from the housing 10.

Figure 5:
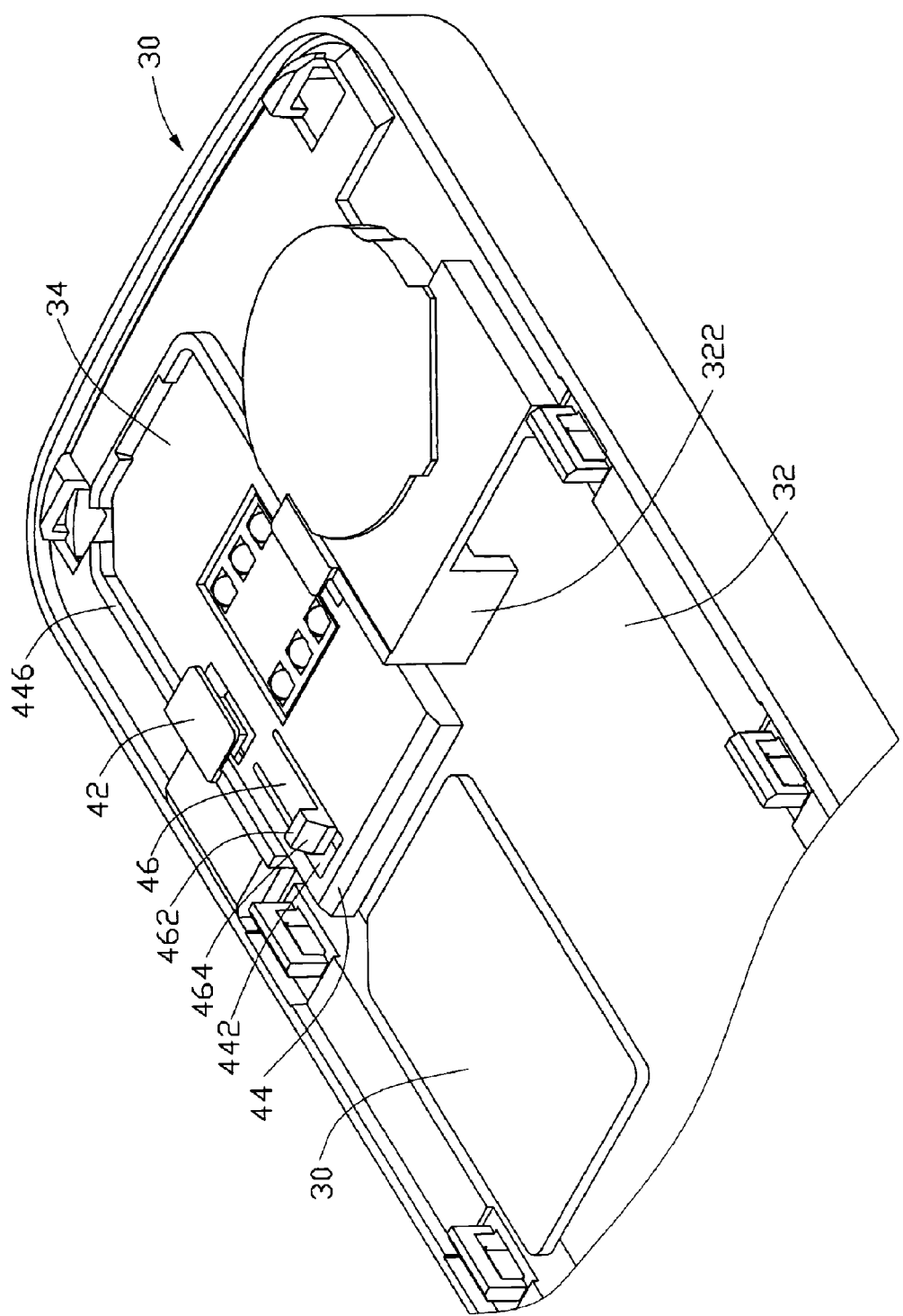
FIG. 5 is an exploded, isometric view of a chip card retaining mechanism according to a second preferred embodiment.
Figure 6:
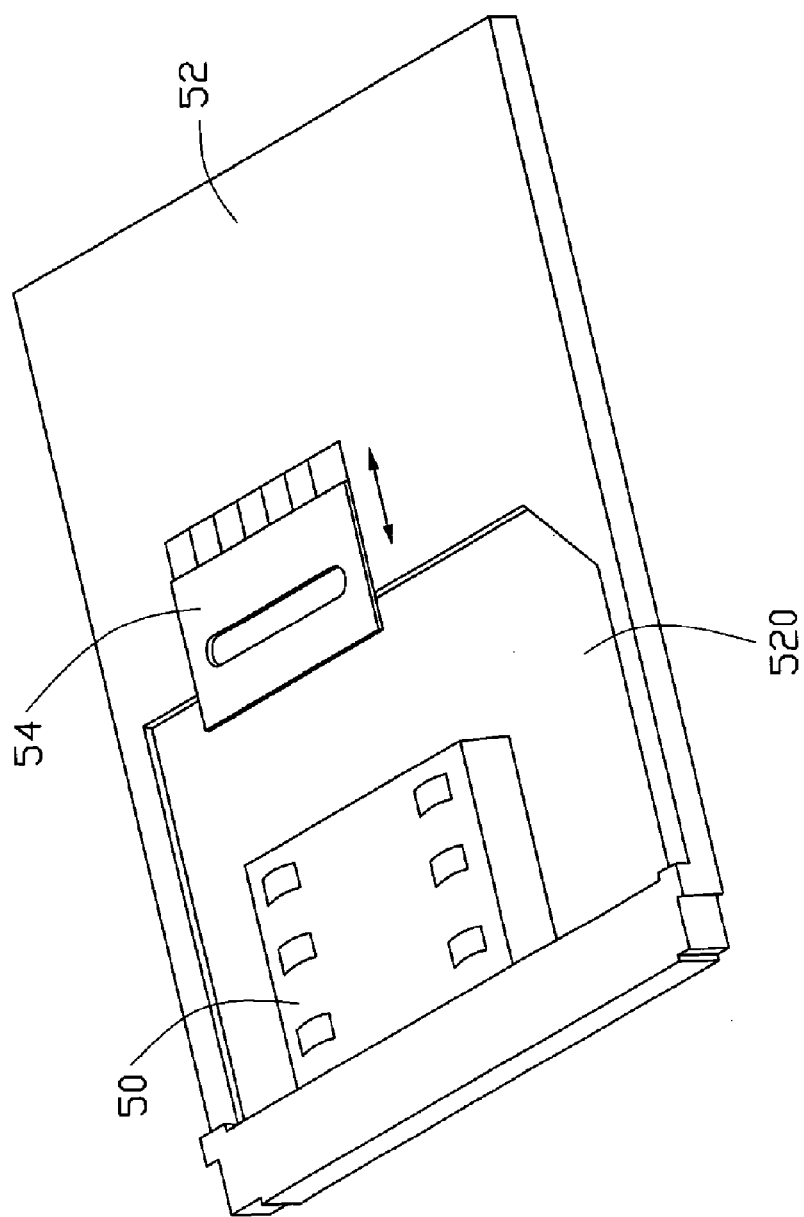
FIG. 6 is an exploded, isometric view of a typical chip card retaining mechanism.

Referring to FIG. 5, a SIM card retaining mechanism according to a second preferred embodiment is provided. The SIM card retaining mechanism includes a receiving groove 34 formed in a housing 30, two wings 42, and an elastic arm 46. The SIM card retaining mechanism is similar to the SIM card retaining mechanism of the first preferred embodiment. The housing 30 is provided with a convex stage 44 extending from a receiving groove 34 toward the battery compartment 32 and ending at an inner wall 322 of the housing 30. The convex stage 44 has a rectangular opening 442 defined adjacent to a side portion 446. The elastic arm 46 is provided in the opening 442 and extends from one end of the opening 442 toward another end of the opening 442 along a direction parallel to a side portion 446. The elastic arm 26 is provided with a latching portion 462. The latching portion 462 has a wedge-shaped plane 464 facing the battery compartment 12, for guiding the chip card 30 into the receiving groove 34. A process of assembling and removing the chip card 30 is same as the chip card retaining mechanism of the first preferred embodiment.

In an alternative embodiment, the receiving groove 14 may be formed as a recess in the upper surface portion 11 of the housing 10, with the strip 144 correspondingly being omitted.

In a further embodiment, the wings 22 can be another stop mechanism. For example, at least one of the first side portion 146 and the second side portion 148 may define a sliding slot in a side thereof facing the receiving groove 14. As such, the chip card 30 can slide along the sliding slot into the receiving groove 14 and be secured in the receiving groove 14.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A chip card retaining mechanism for retaining a chip card mounted in an electronic device, the electronic device including a housing, the housing having a battery compartment defined therein, the chip card retaining mechanism comprising:
   a receiving portion formed on the housing for receiving the chip card therein, the receiving portion having an open end facing the battery compartment of the electronic device; and
   a locking assembly comprising:
   a stop mechanism configured for preventing the chip card from being withdrawn from the receiving portion via a top of the receiving portion;
   an elastic arm formed on the housing, the elastic arm having a latching portion disposed adjacent the open end for abutting the chip card.

2. The chip card retaining mechanism as claimed in claim 1, wherein the stop mechanism includes at least two wings extending from two opposite side portions of the receiving portion toward the receiving portion.

3. The chip card retaining mechanism as claimed in claim 2, wherein the receiving portion is a receiving groove defined by a strip protruding from the housing.

4. The chip card retaining mechanism as claimed in claim 3, wherein the strip including a first side portion and a second side portion parallel to each other, the at least wings extending from the first side portion and the second side portion.

5. The chip card retaining mechanism as claimed in claim 1, wherein the receiving portion is a receiving groove recessed from a surface of the housing.

6. The chip card retaining mechanism as claimed in claim 1, wherein the elastic arm is formed by means of cutting a bottom of the receiving portion to form a U-shaped opening.

7. The chip card retaining mechanism as claimed in claim 6, wherein the elastic arm is arranged to extend along a direction perpendicular to a movement path of the chip card along a horizontal direction.

8. The chip card retaining mechanism as claimed in claim 6, wherein the elastic arm is arranged to extend along a direction parallel to a movement path of the chip card along a horizontal direction.

9. A chip card retaining mechanism for retaining a chip card mounted in an electronic device, the electronic device including a housing, the housing having a battery compartment defined therein, the chip card retaining mechanism comprising:
 a receiving portion formed on the housing for receiving the chip card therein, the receiving portion having an open end facing the battery compartment of the electronic device; and
 a locking assembly comprising:
 a stop mechanism extending from sides of the receiving portion and arranged over a top of the receiving portion;
 an elastic arm formed on the housing, the elastic arm disposed adjacent to the open end, the elastic arm being configured for preventing withdrawal of the chip card from the receiving portion via the open end.

10. The chip card retaining mechanism as claimed in claim 9, wherein the elastic arm has a latching portion formed at one distal end thereof, the latching portion being arranged adjacent to the open end for abutting with the chip card.

11. The chip card retaining mechanism as claimed in claim 10, wherein the receiving portion extends toward the battery compartment a predetermined distance to form a convex stage, the elastic arm being formed by means of cutting the convex stage to form a U-shaped opening.

12. The chip card retaining mechanism as claimed in claim 11, wherein the elastic arm is arranged to span across the open end.

13. The chip card retaining mechanism as claimed in claim 11, wherein the receiving portion extends toward the battery compartment a predetermined distance to form a convex stage, the receiving portion having an opening extending to the convex stage, the elastic arm being provided in the opening.

14. The chip card retaining mechanism as claimed in claim 9, wherein the stop mechanism includes at least two wings extending from two opposite side portions of the receiving portion toward the receiving portion.

15. The chip card retaining mechanism as claimed in claim 10, wherein the receiving portion is a receiving groove defined by a strip protruding from the housing.

16. The chip card retaining mechanism as claimed in claim 15, wherein the strip includes a first side portion and a second side portion parallel to each other, the at least two wings extending from the first side portion and the second side portion.

17. The chip card retaining mechanism as claimed in claim 9, wherein the receiving portion is a receiving groove recessed from a surface of the housing.

18. A portable electronic device comprising:
 a housing having opposite first and second sides, and a battery compartment and a chip card receiving portion defined in the first side, the receiving portion having an open end facing the battery compartment, the open end being configured for insertion and removal of a chip card;
 a cantilevered elastic arm located adjacent to the open end, the elastic arm being integrally formed with the housing and configured for locking the chip card in the receiving portion, the elastic arm being deformable toward the second side to allow insertion and removal of the chip card.

19. The chip card retaining mechanism as claimed in claim 18, wherein the elastic arm is formed by means of cutting a bottom of the receiving portion to form a U-shaped opening.

* * * * *